United States Patent
Stover et al.

(10) Patent No.: US 6,739,116 B2
(45) Date of Patent: May 25, 2004

(54) POWERED ACTUATOR SYSTEM FOR MOWER PARKING BRAKE SYSTEM

(75) Inventors: Dale A. Stover, Plymouth, MN (US); Steven R. Porter, Burnsville, MN (US); Karl D. Heal, Chaska, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/243,484

(22) Filed: Sep. 13, 2002

(65) Prior Publication Data

US 2004/0050026 A1 Mar. 18, 2004

(51) Int. Cl.$^7$ .............................................. A01D 69/10
(52) U.S. Cl. ........................................................ 56/11.3
(58) Field of Search .............................. 56/11.3, 14.2, 56/16.7; 180/271, 272, 286, 305, 307, 315, 648, 332, 333

(56) References Cited

U.S. PATENT DOCUMENTS

| | | | | |
|---|---|---|---|---|
| 3,702,051 A | * | 11/1972 | Deines ........................ 56/11.3 |
| 3,736,729 A | * | 6/1973 | Peterson ...................... 56/10.5 |
| 4,466,504 A | * | 8/1984 | Giandenoto et al. ........ 180/273 |
| 5,162,626 A | * | 11/1992 | Hutchison et al. ......... 200/85 A |
| 5,424,502 A | * | 6/1995 | Williams .................... 200/85 A |
| 5,565,829 A | * | 10/1996 | Loraas et al. ................ 335/205 |
| 6,056,074 A | * | 5/2000 | Heal et al. .................. 180/6.48 |
| 6,161,637 A | * | 12/2000 | Decker et al. .............. 180/6.48 |
| 6,301,864 B1 | * | 10/2001 | Damie et al. ................. 56/11.3 |
| 6,343,668 B1 | * | 2/2002 | Dean .......................... 180/315 |
| 6,359,245 B1 | * | 3/2002 | Wahls ....................... 200/52 R |
| 6,434,917 B1 | | 8/2002 | Bartel |

* cited by examiner

Primary Examiner—Árpád Fab Kovács
(74) Attorney, Agent, or Firm—James W. Miller

(57) ABSTRACT

An electrically powered actuator system is provided for engaging and disengaging the parking brake system of an outdoor power equipment unit, such as a riding lawn mower. The actuator system includes a solenoid that is coupled to the parking brake(s) of the unit by one or more link arms. When the solenoid is deenergized and the armature of the solenoid is extended, the link arms rotate the parking brake (s) into their engaged positions. When the solenoid is energized and the armature of the solenoid is drawn inwardly into the solenoid housing, the link arms rotate the parking brake(s) into their disengaged positions. The solenoid is energized and deenergized by a control system responsive to various switches that detect various operational conditions of the unit, such as the presence of the operator in the seat of the unit and/or the placement of the unit's twin stick propulsion and steering controls in their inboard positions.

22 Claims, 8 Drawing Sheets

FIG. I

POWERED ACTUATOR SYSTEM FOR MOWER PARKING BRAKE SYSTEM

TECHNICAL FIELD

This invention relates to an outdoor power equipment unit, such as a riding lawn mower, having a parking brake system. When engaged, the parking brake system prevents the unit from inadvertently rolling down on an incline. More particularly, this invention relates to a powered actuator system for engaging and disengaging the parking brake system.

BACKGROUND OF THE INVENTION

When operating an outdoor power equipment unit such as a riding lawn mower, the operator frequently needs to dismount the unit. Most units of this type have parking brake systems to prevent the unit from rolling away when the operator dismounts. A manually operated brake lever is usually provided to engage and disengage the parking brake system. If the operator forgets to set or engage the parking brake system as the operator dismounts, the unit can roll away if the unit is located on an incline when the operator dismounts. This is obviously undesirable.

Similarly, the operator must also remember to disengage the parking brake system when he remounts the unit to continue operating the unit. If the operator does not and the parking brake system remains engaged, there is a potential for damaging the parking brake system or drive train of the unit. At the very least, the parking brake system and drive train experience undue wear if the unit is driven while the parking brake system remains engaged. Thus, the operator must pay careful attention to the parking brake system to make sure it is engaged when he dismounts and is disengaged after he remounts before he commences operation of the unit.

Various riding lawn mowers are controlled by twin control sticks or handles that are selectively manipulated by the operator to propel and steer the unit. The control sticks have a neutral position in which the unit is at rest. To propel the unit forwardly, the sticks are pushed forwardly by the operator from the neutral position. To propel the unit rearwardly, the sticks are pulled rearwardly by the operator from the neutral position. Steering is accomplished by pushing or pulling on one stick more than the other or even by pushing one stick forwardly while pulling the other stick rearwardly. U.S. Pat. No. 3,702,051 to Deines shows a mower of this type.

The twin control sticks of units of this type have an inboard position in front of the operator's seat where they are conveniently located in front of the operator's hands. However, in this position, the operator cannot easily reach the seat for mounting and dismounting as the control sticks obstruct access to the seat. Thus, such control sticks are also pivotal about longitudinal, fore-and-aft axes to allow the sticks to be pivoted laterally into outboard positions. In their outboard positions, the control sticks do not obstruct the operator's access to the seat.

Accordingly, to dismount the unit, a seated operator first pivots the control sticks laterally into their outboard positions to clear the way for dismounting. To remount the unit, the operator first climbs back onto the seat by passing between the control sticks when such control sticks are disposed in their outboard positions. After the operator is reseated, the operator can then pivot the control sticks from their outboard positions back into their inboard positions until the control sticks are located generally in front of the operator as the operator sits on the seat. The fact that the control sticks in a twin stick unit of this type laterally pivot between inboard and outboard positions to allow mounting and dismounting is well known in the mower art.

U.S. Pat. No. 6,434,917 to Bartel shows a twin stick mower in which the control sticks are linked by mechanical linkages to a parking brake system comprising a pair of parking brakes, one for each drive train controlled by each control stick. In Bartel, the mechanical linkages are elongated and extend vertically to connect between the parking brakes and the control sticks. Moreover, the linkages include ball joints to accommodate the lateral pivoting of the control sticks when the control sticks are placed in their outboard positions. Thus, the mechanical linkages are relatively cumbersome and are located in an area of the mower where space is tight.

SUMMARY OF THE INVENTION

One aspect of this invention relates to an outdoor power equipment unit which comprises a frame supported for movement over the ground by a plurality of wheels. At least one wheel is a drive wheel to propel the frame over the ground. An implement is carried on the frame for performing a ground or turf grooming or working operation. A parking brake system is provided on the frame. A powered actuator disengages the parking brake system when the powered actuator is energized.

One aspect of this invention relates to an outdoor power equipment unit which comprises a frame supported for movement over the ground by a plurality of wheels. At least one wheel is a drive wheel to propel the frame over the ground. An implement is carried on the frame for performing a ground or turf grooming or working operation. A parking brake system is provided on the frame. At least one freewheel lever is provided for allowing the at least one drive wheel to freewheel so the unit can be manually pushed or pulled. A manually actuated release member is also provided that can be moved by the operator into a first position for releasing the freewheel lever to allow freewheeling. The manually actuated release member in the first position thereof also manually disengages the parking brake system.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
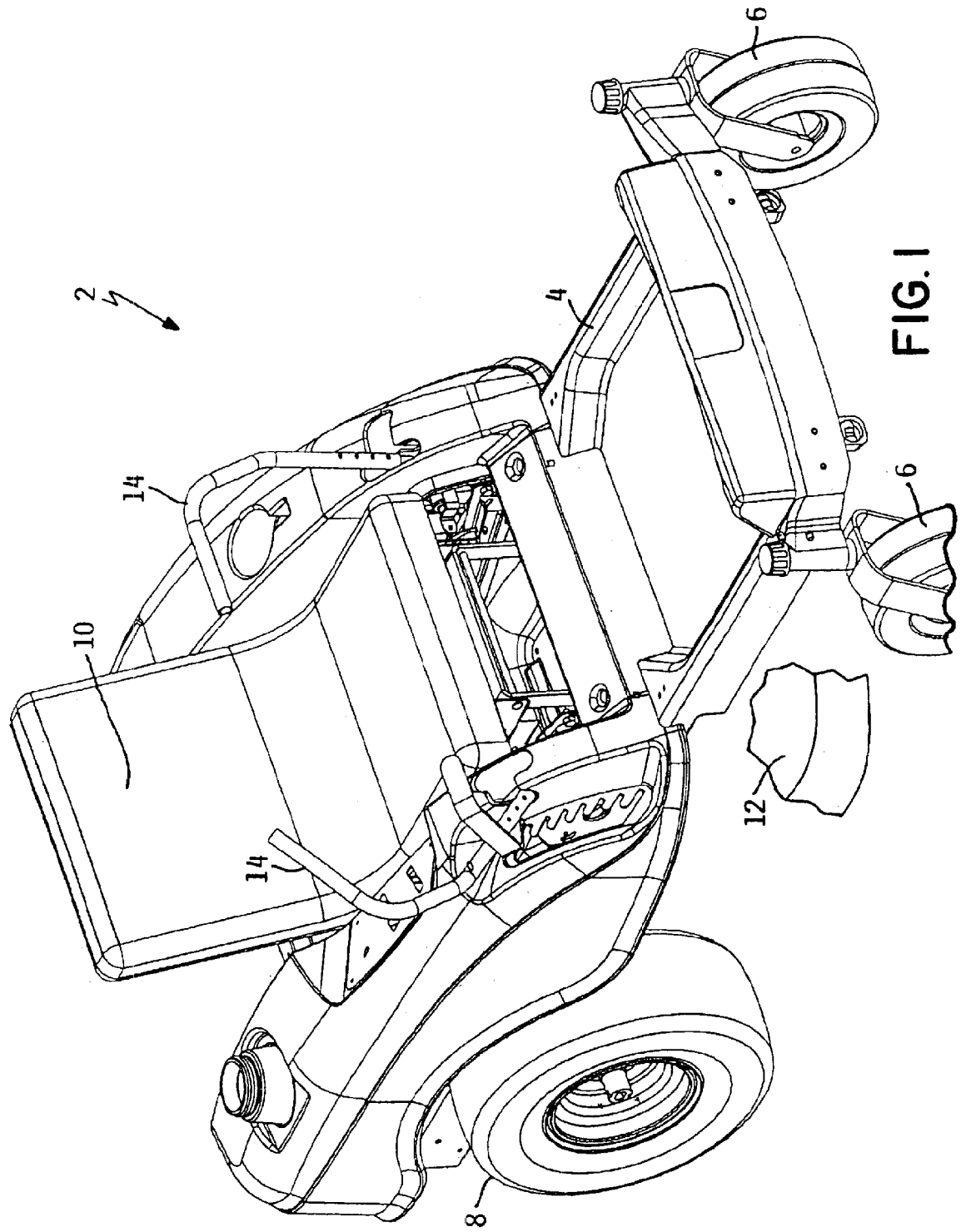
FIG. 1 is a perspective view of a typical outdoor power equipment unit of the type to which this invention relates, the unit comprising a riding lawn mower.

FIG. 1 illustrates a portion of an outdoor power equipment unit 2 comprising a riding mower. Unit 2 includes a frame 4 supported for movement over the ground by a pair of front caster wheels 6 and a pair of rear drive wheels 8. A seat 10 is provided on frame 4 for supporting a seated operator. An internal combustion engine or the like (not shown) is provided on the rear of frame 4 behind seat 10 to power unit 2. A cutting deck 12 is mounted underneath frame 4 between front caster wheels 6 and rear drive wheels 8 for mowing grass or the like.

Unit 2 includes two control sticks 14 for allowing the operator to cause unit 2 to move in forward and reverse and to steer unit 2. Each control stick 14 controls an independent hydrostatic transmission or transaxle 16 that drives one of the rear drive wheels 8 in a known manner. The internal combustion engine (not shown) powers each transaxle 16 as well as cutting deck 12. Each transaxle 16 can be operated separately from the other and at different speeds by its corresponding control stick 14 to achieve both propulsion and steering of unit 2.

Each control stick 14 has an inboard position in which the top of control stick 14 is located in front of the operator as the operator sits on seat 10. Control stick 14 for operating the left drive wheel 8 is shown in this inboard position in FIG. 1. Each control stick 14 also has a laterally pivoted, outboard position in which control stick 14 has been pivoted to one side largely out of the way of seat 10 to permit the operator to more easily mount and dismount seat 10. Control stick 14 for operating the right drive wheel 8 is shown in this laterally pivoted, outboard position in FIG. 1.

Normally, both control sticks 14 are usually disposed in the same position, i.e. both control sticks 14 are either in their inboard positions or in their laterally pivoted, outboard positions at the same time, though it is physically possible to have one stick 14 in one position and the other stick 14 in the other position as shown in FIG. 1. FIG. 1 illustrates the sticks with one stick 14 in one position and the other stick 14 in the other position simply so that both the inboard and outboard stick positions are illustrated in a single view.

Figure 2:
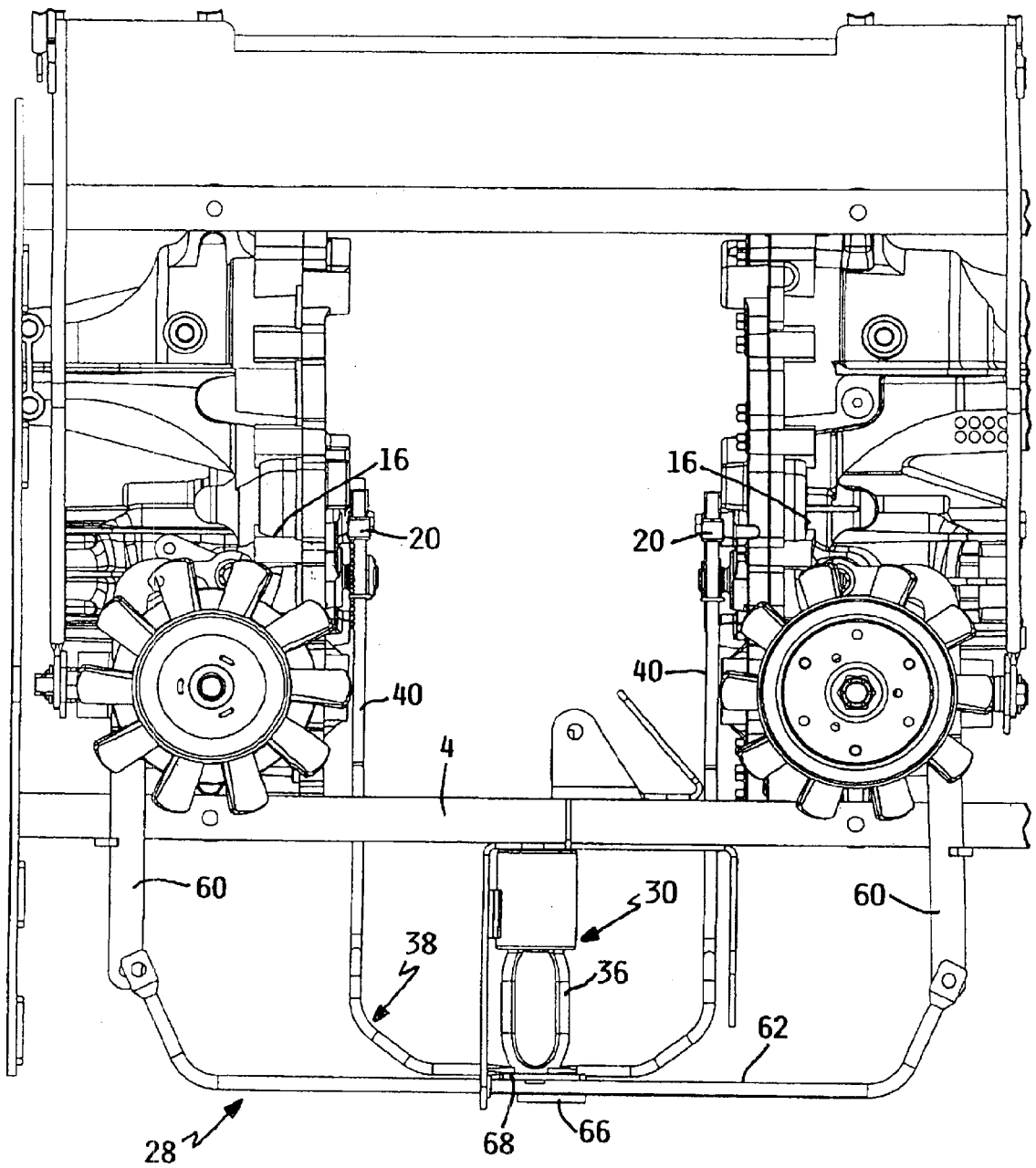
FIG. 2 is a top plan view of a portion of the outdoor power equipment unit shown in FIG. 1 particularly illustrating the mechanical components of a first embodiment of an actuator system according to this invention for engaging and disengaging the parking brake system of the unit.
Figure 3:
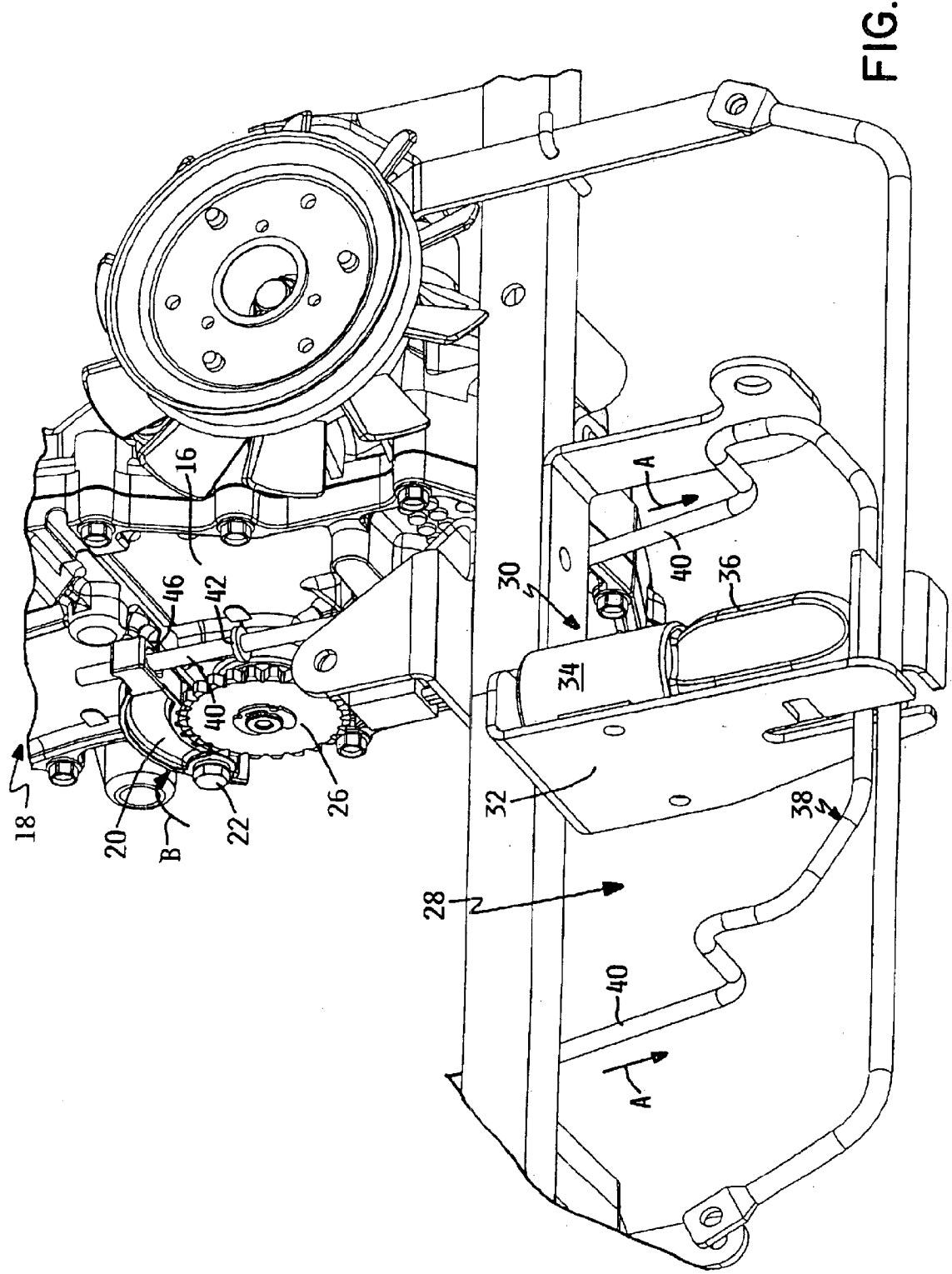
FIG. 3 is an enlarged partial perspective view of some of the mechanical components of the first embodiment of the actuator system shown in FIG. 2, particularly illustrating an engaged position of one of the parking brakes of the parking brake system.
Figure 4:
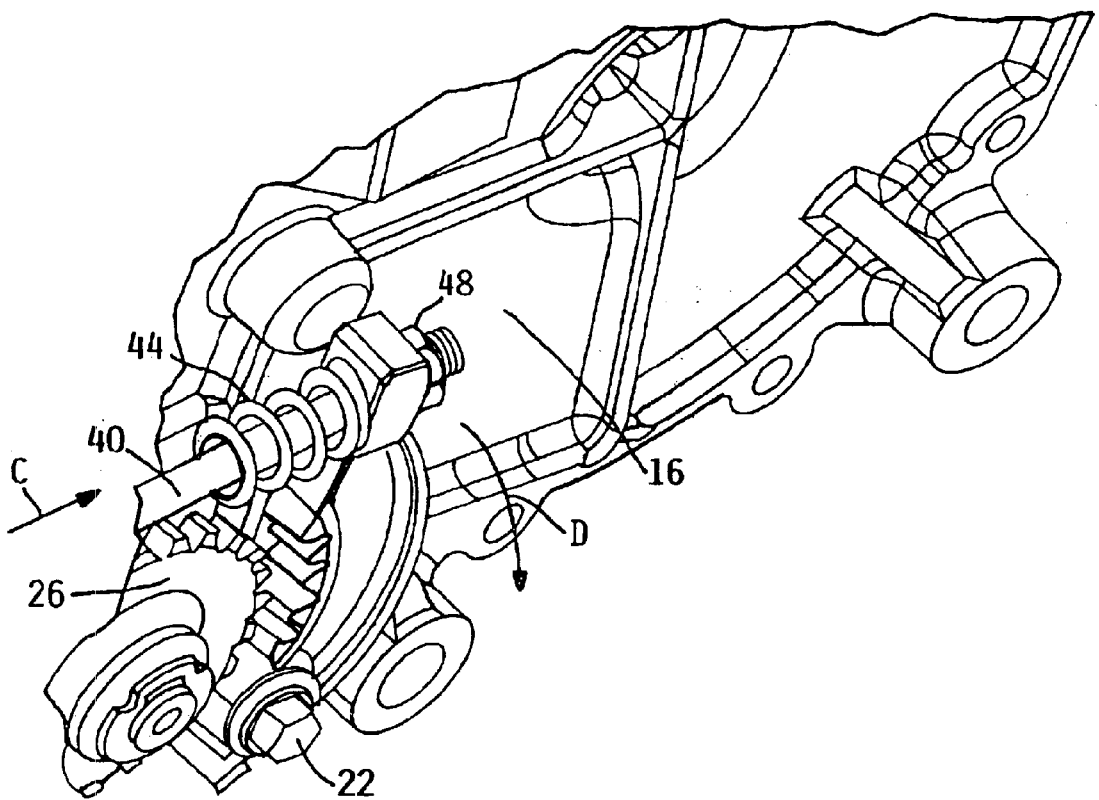
FIG. 4 is an enlarged partial perspective view of some of the mechanical components of the first embodiment of the actuator system shown in FIG. 2, particularly illustrating a disengaged position of one of the parking brakes of the parking brake system.

Unit 2 also includes a parking brake system 18, shown generally as in FIGS. 2–4, for preventing unit 2 from rolling when it is parked. Because unit 2 includes two independent transaxles 16 for powering the two drive wheels 8, parking brake system 18 includes two independent parking brakes 20, one for each transaxle 16.

Each parking brake 20 is pivotally mounted on the housing of a transaxle 16 by a pivot pin 22. Each parking brake 20 has teeth 24 for meshing with an external gear 26 of transaxle 16. When the parking brake 20 is pivoted into meshing engagement with gear 26 as shown in FIG. 3, transaxle 16 is locked up to prevent transaxle 16 from rotating to thereby lock the corresponding drive wheel 8. When the parking brake 20 is pivoted out of meshing engagement with gear 26 as shown in FIG. 4, transaxle 16 and its associated drive wheel 8 are both free to rotate.

While the use of a parking brake system 18 comprising two independent parking brakes 20 has been illustrated, it would be possible to have a parking brake system 18 which deletes one of the two parking brakes 20. Locking up a single transaxle 16 and its associated drive wheel 8 should be sufficient to prevent unit 2 from rolling. However, it is preferred to use dual parking brakes 20 when dual independent transaxles 16 are used. Thus, the number of parking brakes 20 within parking brake system 18 can obviously be varied as long as there is at least one such parking brake 20.

In addition, parking brakes 20 that are mechanically different from pivotal parking brakes engaging a gear on a transaxle could also be used. This is particularly true where the drive wheels 8 are driven by some type of drive system other than that shown herein. Thus, the nature of the parking brake(s) used within parking brake system 18 can also be varied. The phrase "parking brake system" as used herein is simply meant to apply to any system that has at least one parking brake for holding unit 2 stationary when it is parked with such parking brake having both an engaged and disengaged position.

Referring now to FIGS. 2–5, this invention relates to a powered actuator system 28 for engaging and disengaging parking brake system 18. Actuator system 28 comprises a powered actuator which, in a preferred embodiment, is an electrical solenoid 30. Solenoid 30 is mounted to frame 4 of unit 2 by an L-shaped mounting bracket 32. Solenoid 30 includes a solenoid housing 34 and an armature 36 that can be drawn into solenoid housing 34 when solenoid 30 is energized. Solenoid 30 is shown in its deenergized position in the drawings in which armature 36 is extended out of solenoid housing 34 by an internal spring (not shown).

A U-shaped linkage 38 is secured to armature 36 of solenoid 30 with linkage 38 having first and second longitudinal link arms 40. Each link arm 40 is attached to the top of one parking brake 20 to pivot each parking brake 20 about its pivot pin 22. When solenoid 30 is deenergized, armature 36 is extended out of solenoid housing 34, causing link arms 40 to move longitudinally in one direction as indicated by the arrows A in FIG. 3. This rotates each parking brake 20 about its pivot pin 22, as shown by the arrow B in FIG. 3, to engage parking brake 20. Thus, whenever solenoid 30 is deenergized, parking brake system 18 will be engaged, i.e. both parking brakes 20 will be rotated forwardly into meshing engagement with their respective gears 26 on their respective transaxles 16.

Each link arm 40 includes an abutment near one end in the form of washer 42 or the like fixed to link arm 40. A compression spring 44 is sandwiched between washer 42 and the front face of the top of one of the parking brakes 20. The force of spring 44 tends to rotate the parking brake 20 in a direction to disengage parking brake 20, as shown by the arrow D in FIG. 4. Link arm 40 passes through an aperture 46 in the top of parking brake 20 and a threaded nut 48 on the end of link arm 40 bears against the rear face of the top of the parking brake 20. Normally, in the engaged position of parking brake 20, link arm 40 is positioned so that nut 48 on the end of link arm 40 has engaged and rotated parking brake 20 into engagement with gear 26, notwithstanding the force of spring 44 which would normally rotate parking brake 20 away from the engaged position.

Parking brake system 18 is disengaged by energizing solenoid 30 to pull armature 36 into solenoid housing 34. When this occurs, link arms 40 also move longitudinally in a second direction as indicated by the arrow C in FIG. 4. As each link arm 40 moves longitudinally, link arm 40 is free to slide back through aperture 46 in the top of parking brake 20 to move nut 48 on the end of link arm 40 away from the rear face of the top of parking brake 20. However, as nut 48 moves, the torque exerted by spring 44 on the top of parking brake 20 is now free to rotate parking brake 20 in the direction of the arrow D such that the rear face of the top of parking brake 20 is always kept in abutting engagement with nut 48. As parking brake 20 pivots because it is now allowed to do so by virtue of the travel of nut 48, it pivots sufficiently to pull teeth 24 thereon out of engagement with gear 26 to disengage parking brake 20. This disengaged position of parking brake 20 is shown in FIG. 4.

Spring 44 and nut 48 on link arm 40 are illustrated in FIG. 4, but have not been illustrated in the other figures for the purpose of clarity in the drawings.

Figure 6:
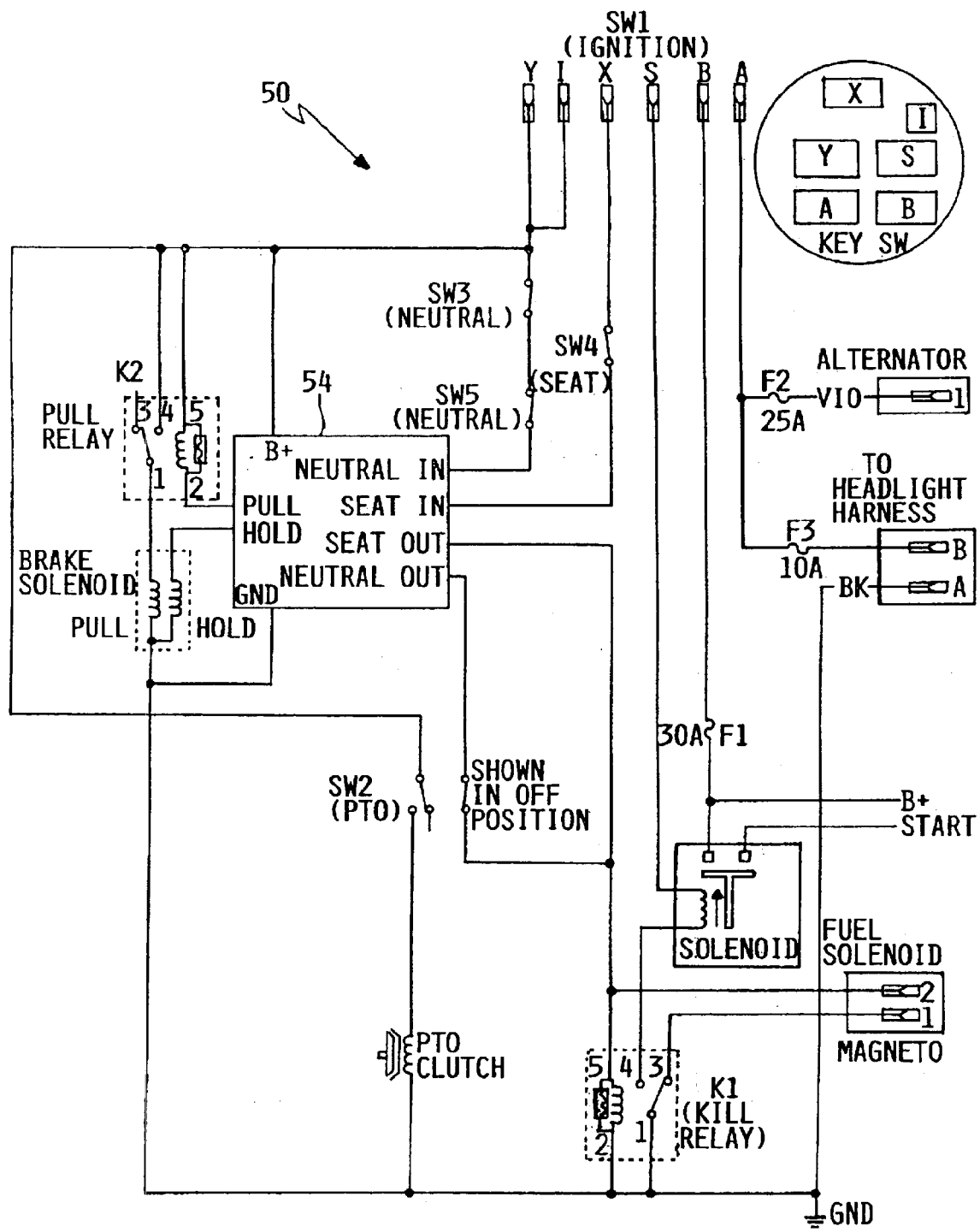
FIG. 6 is a schematic diagram of the electrical control circuit of the first embodiment of the actuator system as shown in FIG. 2.

Referring now to FIG. 6, a control system 50 for energizing and deenergizing solenoid 30 is illustrated. Control system 50 and solenoid 30 are operated from the electrical system of unit 2, namely from the alternator (not shown) that is driven by the engine and/or from the vehicle battery (not shown) that is included on unit 2. A key switch SW1 is provided for energizing and deenergizing the electrical system of unit 2. When key switch SW1 is on, the electrical system is powered. When key switch SW1 is off, the electrical system is unpowered. When key switch SW1 is off and the electrical system is unpowered, solenoid 30 is itself obviously unpowered and is disposed in its non-actuated state where armature 36 is extended from solenoid housing 34 such that parking brake system 18 is engaged.

An electrical sensor or switch SW4 is associated with seat 10 for detecting whenever the operator is sitting in seat 10. Seat switch SW4 is closed when the operator is sitting in seat 10 and is open when the operator is not sitting in seat 10. Similarly, two electrical sensors or switches SW3 and SW5 are associated with control sticks 14, one for each control stick 14, to detect when control sticks 14 are placed in their inboard positions. Control stick switches SW3 and SW5 again are closed when control sticks 14 are placed in their inboard positions and are open when control sticks 14 are not in their inboard positions. Switches SW3–SW5 are all connected to a logic and control chip 54 that is part of control system 50 as shown in FIG. 6.

When logic and control chip or circuit 54 determines that two conditions are met, namely the operator is sitting in seat 10 and control sticks 14 are in their inboard positions, logic and control chip or circuit 54 sends a signal to energize solenoid 30 to disengage parking brake system 18. If either condition is not met, namely the operator's presence in seat 10 cannot be detected or either control stick 14 is not in its inboard position, logic and control chip or circuit 54 will keep solenoid 30 deenergized to keep parking brake system 18 engaged.

Logic and control chip or circuit 54 preferably provides a short time delay upon opening of seat switch SW4 before energizing solenoid 30. Thus, if the operator merely momentarily bounces up off seat 10 during operation of unit 2, this will not cause logic and control chip or circuit 54 to immediately engage parking brake system 18. The operator must be out of seat 10 for longer than the predetermined time delay period in order for logic and control chip or circuit 54 to deenergize solenoid 30 and engage parking brake system 18.

Solenoid 30 includes two coils for pulling in armature 36, namely a pull coil 56 and a hold coil 58. Pull coil 56 is a high current or high amp coil that generates a magnetic field strong enough to pull solenoid armature 36 into solenoid housing 34. Hold coil 58 is a lower current or lower amp coil that conserves power. Hold coil 58 has a strong enough magnetic field to hold solenoid armature 36 within solenoid housing 34 but not strong enough to pull solenoid armature 36 into solenoid housing 34 by itself. When solenoid 30 is energized, logic and control chip or circuit 54 will activate both coils 56 and 58. After solenoid 30 is energized and drawn into solenoid housing 34 by pull coil 56, pull coil 56 is then deenergized to conserve power while hold coil 58 remains activated to keep solenoid 30 energized.

As described thus far, actuator system 28 of this invention ensures the automatic engagement of parking brake system 18 of unit 2 whenever the operator leaves unit 2 and places control sticks 14 into their laterally pivoted, outboard positions. An operator will often stop and dismount unit 2 while mowing without turning off key switch SW1 as, for example, when the operator wishes to clear an obstruction or perform some other short lived work task-off unit 2. The operator need not think about engaging parking brake system 18. This invention does it automatically as the operator leaves unit 2. Similarly, once the operator remounts unit 2 and is again in seat 10 with control sticks 14 in front of him in their normal inboard positions, actuator system 28 of this invention automatically disengages parking brake system 18. Clearly, this avoids the operator having to continually manually engage and disengage parking brake system 18 as the operator gets on and off unit 2.

Moreover, actuator system 28 of this invention accomplishes this result without any complicated mechanical linkages extending between control sticks 14 and parking brakes 20. Instead, solenoid 30 and U-shaped linkage 38 with its link arms 40 can be mounted to the bottom of frame 4 in a relatively unobstructed space. The necessary electrical switches and sensors SW1 and SW3–SWS as well as control system 50 including logic and control chip or circuit 54 can be mounted in many convenient spots on unit 2. Thus, actuator system 28 of this invention is easier to install and maintain in unit 2.

Moreover, actuator system 28 of this invention keeps parking brake system 18 engaged even if control sticks 14 are moved into their inboard positions by manipulation, inadvertent or otherwise, of control sticks 14 from someone standing on the ground when the operator is not also sitting in seat 10. Thus, there is less likelihood of parking brake system 18 being inadvertently disengaged and unit 2 rolling down an incline.

Another embodiment of this invention would be an actuator system 28 which responds only to control stick switches SW3 and SW5 with seat switch SW4 being deleted. In this embodiment, the operator's presence or absence on seat 10 would have no control influence on the energization of solenoid 30. Instead, solenoid 30 would be energized only when control sticks 14 leave their inboard positions by being placed into their outboard positions, as sensed by switches SW3 and SW5. In addition, this embodiment could be further modified such that only one control stick switch SW3 or SW5 would be provided such that energization of solenoid 30 would be controlled only by the placement of one control stick 14 into its outboard position.

Typically, each transaxle 16 provided on unit 2 for powering a rear drive wheel 8 is provided with a freewheel lever 60 that may be manually actuated by the operator to put transaxle 16 into a freewheel mode to allow unit 2 to be manually pushed or pulled. This freewheeling of the drive is often needed when the engine can't be started or unit 2 otherwise can't be driven. Freewheeling enables unit 2 to be moved for the sake of convenience or repair. The use of freewheel levers 60 on transaxles 16 for letting the user manually put transaxles 16 into their freewheel mode is known per se in prior art transaxles.

Figure 5:
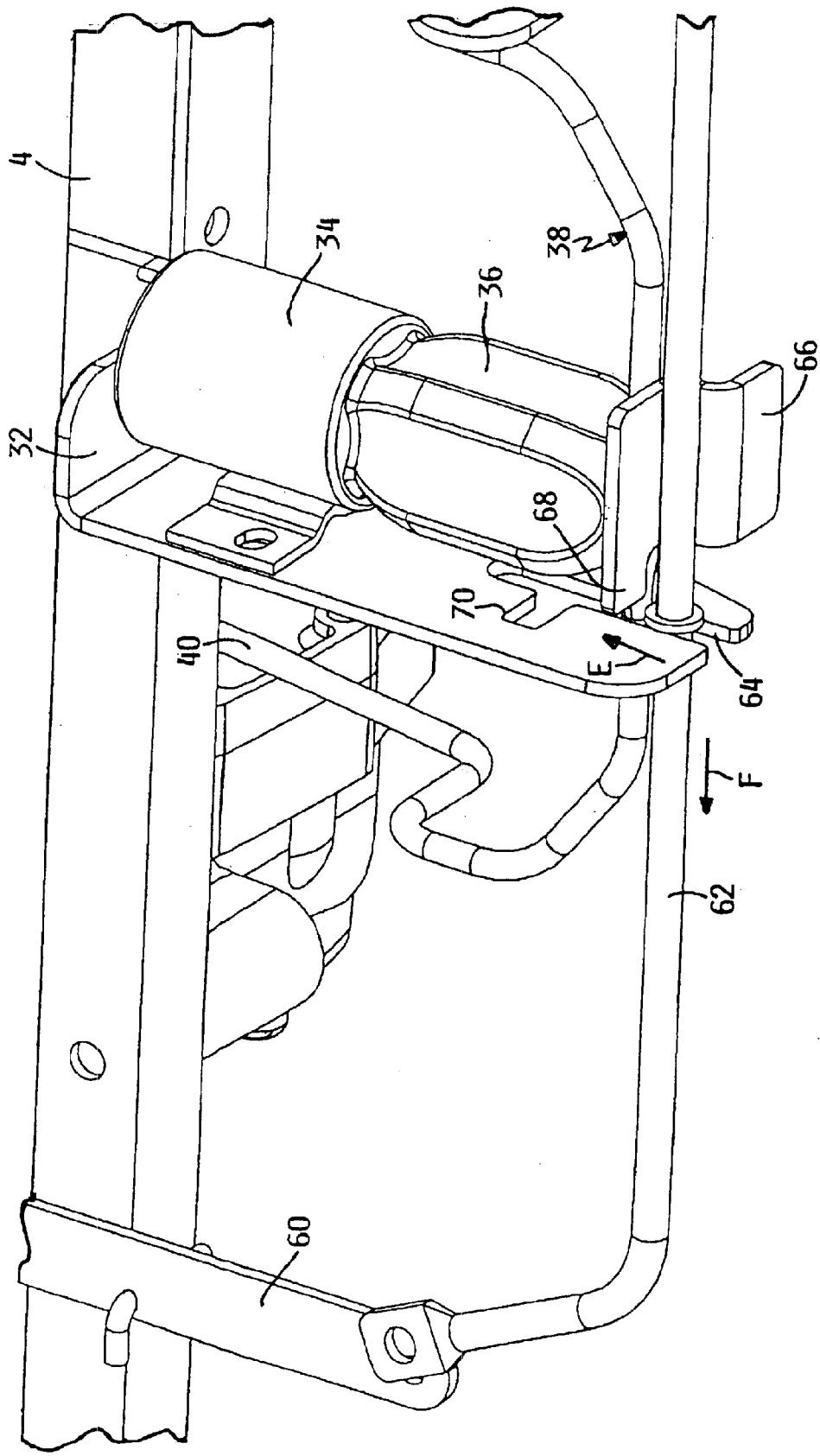
FIG. 5 is an enlarged partial perspective view of some of the mechanical components of the first embodiment of the actuator system shown in FIG. 2, particularly illustrating the solenoid for engaging and disengaging the parking brake system and the transmission manual release for allowing freewheeling.

Referring now to FIGS. 2 and 5, a transaxle release member 62 is provided for manually pushing on freewheel levers 60 to place both transaxles 16 into their freewheel modes. Each end of transaxle release member 62 is pinned or pivoted to the front end of one freewheel lever 60. Transaxle release member 62 is a long elongated rod that is arranged to lie in front of and in line with linkage 38 on armature 36 of solenoid 30. Transaxle release member 62 is slidably received in a fore-and-aft extending longitudinal slot 64 on solenoid mounting bracket 32 so that transaxle release member 62 can be slid longitudinally as indicated by the arrow E in FIG. 5. Transaxle release member 62 includes a downwardly extending tab or handle 66 to allow the operator to manually push on transaxle release member 62 in the direction of arrow E.

When the operator pushes in on transaxle release member 62 in the direction of the arrow E to manually push on both freewheel levers 60 of both transaxles 16, transaxle release member 62 will abut against and also manually push inwardly on armature 36 of solenoid 30 to simultaneously release parking brake system 18. Thus, with a single manual push on transaxle release member 62, the operator can simultaneously push in both freewheel levers 60 and linkage 38 for releasing parking brake system 18. This simultaneously places unit 2 into its freewheel mode and disengages parking brakes 20 to, in fact, allow unit 2 to freewheel. This is easier and more convenient than having to manually and individually release separate freewheel levers 60 as well as having to remember to manually disengage parking brake system 18.

Transaxle release member 62 has to be retained in its inwardly pushed position in order to keep transaxles 16 in their freewheel modes and to keep parking brakes 20 disengaged. This is accomplished by placing a lateral latch finger 68 on transaxle release member 62 which latch finger 68 points toward mounting bracket 32. When transaxle release member 62 has been pushed in far enough so that freewheel levers 60 have been released and parking brakes 20 have been manually disengaged, lateral latch finger 68 will become aligned with a vertical slot or aperture 70 in bracket 32. The operator can then simply slide transaxle release member 62 laterally, as shown by the arrow F in FIG. 5, until the end of lateral latch finger 68 enters slot or aperture 70. This will retain transaxle release member 62 in its inwardly pushed position until such time as the operator grabs handle 66 and slides transaxle release member 62 back laterally in a direction to disengage the latch formed by lateral latch finger 68 and slot or aperture 70.

A desirable consequence of using transaxle release member 62 to tie the operation of freewheel levers 60 to that of actuator system 28 is that freewheel levers 60 and parking brakes 20 are released at the same time. When transaxle release member 62 is unlatched from slot or aperture 70, the spring inside solenoid 30 will be sufficient to push both solenoid armature 36 and transaxle release member 62 back outwardly to their normal unlatched positions. Thus, an operator cannot reengage freewheel levers 60 to reengage the drive train while forgetting to reengage parking brake 20. As soon as the drive train is reengaged by resetting freewheel levers 60 to their usual positions, parking brakes 20 are also automatically reengaged.

While armature 36 of solenoid 30 is normally extended outwardly from solenoid housing 34 by a spring (not shown) within housing 34, this spring need not be so located, but could be located elsewhere and even outside of housing 34. All that is required is that this biasing spring operatively act on armature 36 in some fashion to cause armature 36 to be extended out from solenoid housing 34 when the coils of solenoid 30 are not electrically energized.

This concludes the description of the first embodiment of actuator system 28 of this invention. While this embodiment includes in its preferred mode the inclusion of transaxle release member 62 for tying in the operation of the manual release of freewheel levers 60 to movement of solenoid 30 for releasing parking brake system 18, this is not required. Transaxle release member 62 could be dispensed with such that each freewheel lever 60 would still be engaged or disengaged manually with some type of other manual release then being provided for parking brake system 18 as well. In addition, a transaxle release member 62 that simultaneously disengages a parking brake system when transaxle release member 62 is operated to place unit 2 in a freewheel mode could be used with parking brake systems that are not engaged or disengaged by a powered actuator system 28 of the type disclosed herein.

A second embodiment of an actuator system according to this invention will be referred to as 28'. Actuator system 28' includes the same mechanical components as used with respect to actuator system 28 as such components are shown in FIGS. 2–5. In other words, actuator system 28' includes the same solenoid 30 and U-shaped linkage 38 for engaging and disengaging parking brakes 20. In addition, actuator system 28' includes the same transaxle release member 62 for manually releasing freewheel levers 60 and for manually pushing in on solenoid armature 36 to disengage parking brakes 20. Since these components are all the same, they will not be illustrated again in conjunction with actuator system 28'. The primary difference between the first and second embodiments of the actuator system is the control system that energizes and deenergizes solenoid 30.

Figure 7:
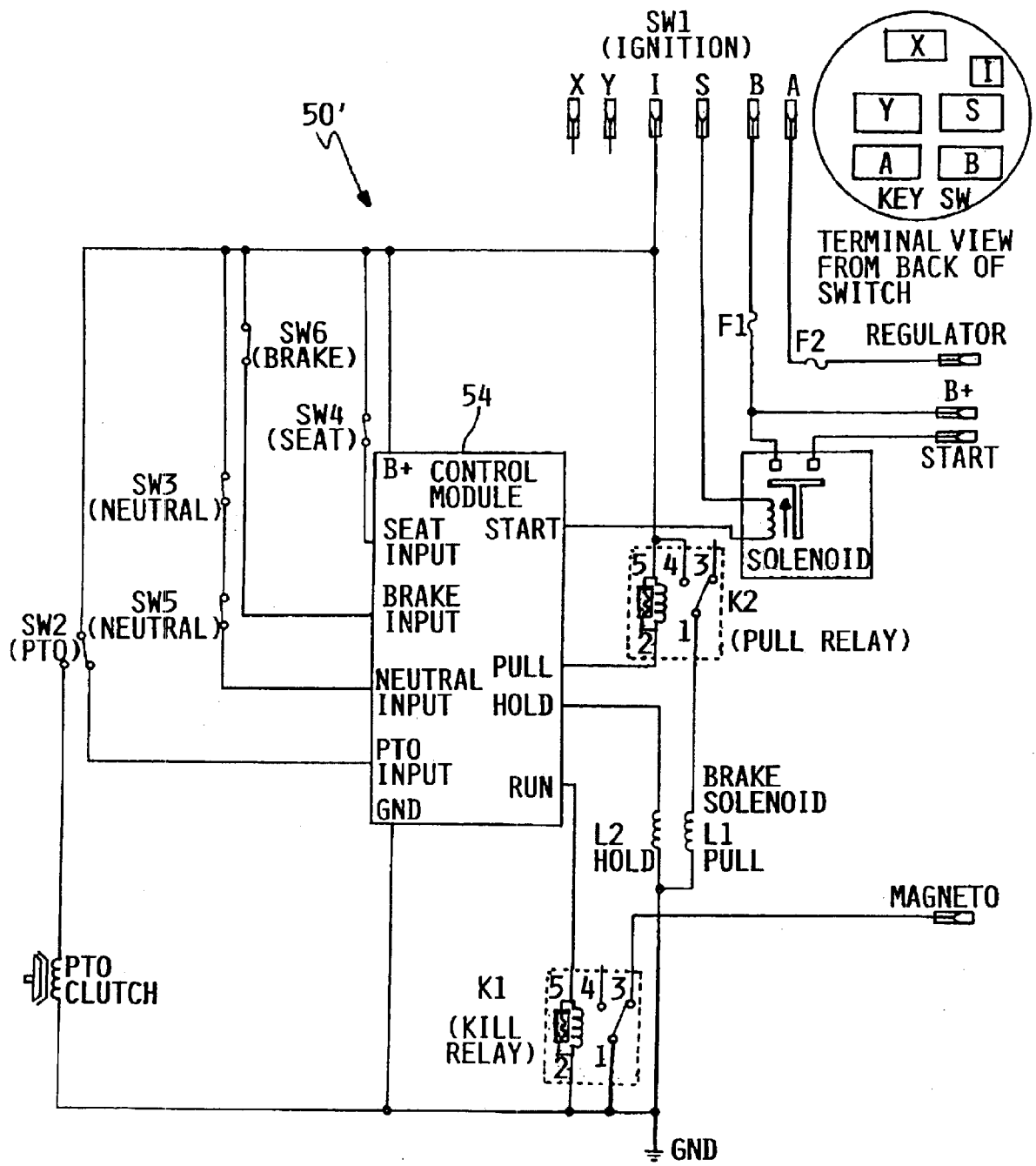
FIG. 7 is a schematic diagram of the electrical control circuit of a second embodiment of the actuator system, the second embodiment of the actuator system having the same mechanical components as shown in FIG. 2 with respect to the first embodiment of the actuator system.
Figure 8:
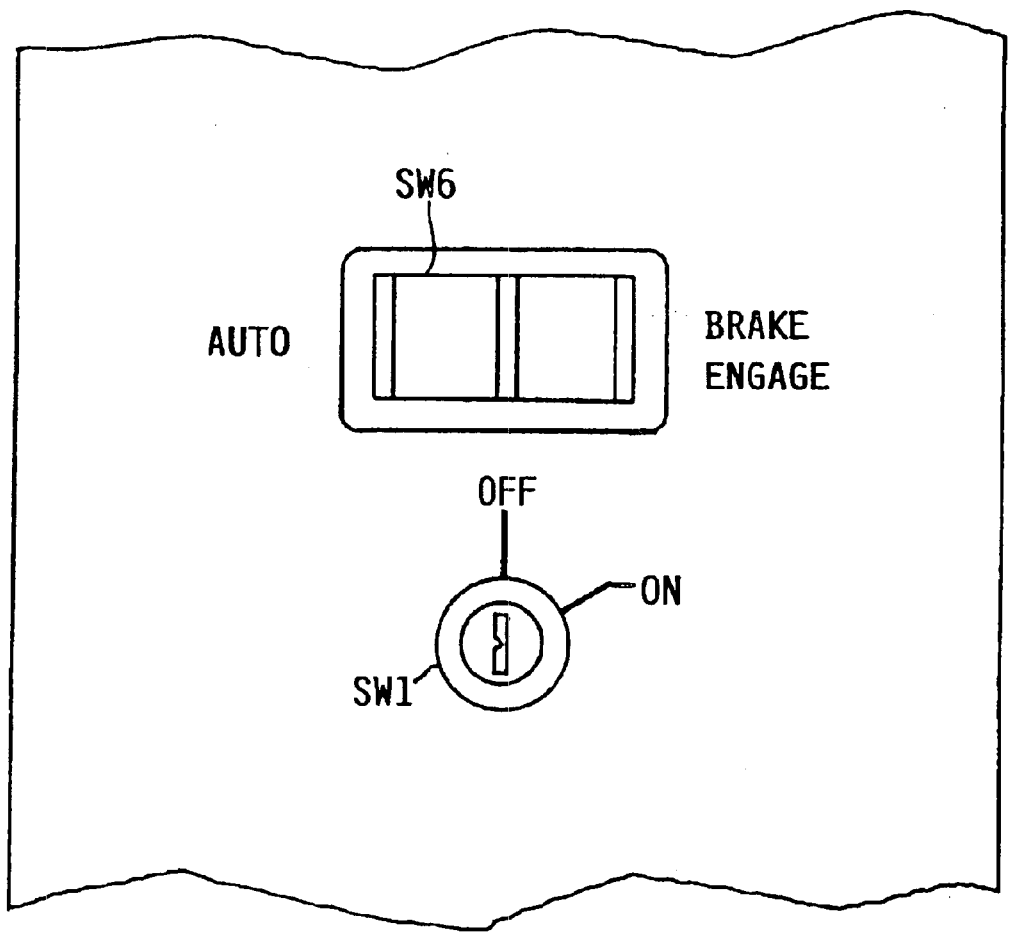
FIG. 8 is a top plan view of a portion of the electrical control system of the second embodiment of the actuator system, particularly illustrating a key switch and a two position toggle or rocker switch that forms part of the electrical control system of the second embodiment.

FIG. 7 illustrates control system 50' for actuator system 28' of this invention. FIG. 8 illustrates various switches used in control system 50'. These switches include a key switch SW1 for applying power to the electrical system of unit 2, including for applying power to logic and control chip or circuit 54 used in control system 50'. In addition to key switch 52', a manually operable toggle or rocker type brake switch SW6 is mounted on a control panel to be accessible to the operator to allow the operator to select between one of two positions of switch SW6. One position of brake switch SW6 can be labelled Auto while the other position of brake switch SW6 can be labelled Brake Engage, though obviously the words used to label the positions could be changed to something else.

In control system 50', turning key switch SW1 off removes power from the electrical system of unit 2 and, of course, removes any possibility of powering solenoid 30, thus placing solenoid 30 in its deenergized state such that parking brake system 18 is engaged. Thus, whenever key switch SW1 is off, parking brake system 18 is always engaged, as was true in the first embodiment as well. Key switch SW1 must be in its on position with the electrical system of unit 2 powered for there to be any possibility of parking brake system 18 being disengaged.

However, merely turning key switch SW1 on does not automatically disengage parking brake system 18 as the operator could turn key switch SW1 on without being on seat 10 of unit 2. Instead, in actuator system 28' of this invention, and when brake switch SW6 is in its Auto position, the disengagement of parking brake system 18 is controlled solely by the presence of the operator in seat 10. When logic and control chip or circuit 54 detects the presence of the operator in seat 10, as signalled by seat switch SW4, it will energize solenoid 30 as in the first embodiment to disengage parking brake system 18. When the operator stops unit 2 and dismounts by leaving seat 10, this is also detected through seat switch SW4 and parking brakes 20 will be automatically engaged by deenergizing solenoid 30. Again, this automatic control of parking brake system 18 in response to the operator's presence in seat 10 happens when brake switch SW6 is in the Auto position.

If the operator were to stop unit 2 while operating it but remain in seat 10, unit 2 could start rolling if unit 2 were on an incline since parking brake system 18 would remain disengaged. The reason for the Brake Engage position of brake switch SW6 is to allow the operator to manually override the control provided by seat switch SW4 by manually signalling to logic and control chip or circuit 54 that parking brake system 18 should be engaged by energizing solenoid 30. Thus, whenever brake switch SW6 has been placed in the Brake Engage position by the operator, parking brake system 18 will be engaged regardless of whether the operator is in seat 10 or not. This allows the operator to manually stop unit 2 from rolling if need be even when the operator remains in seat 10 of unit 2.

In actuator system 28', the position of control sticks 14, namely whether such sticks are disposed in their inboard positions or outboard positions is not used to control parking brake system 18. However, whether or not control sticks 14 are in their neutral position in which unit 2 is at rest, or have been rotated either forwardly or rearwardly out of their neutral position to cause either forward or reverse propulsion of unit 2, is sensed through two control stick switches SW3 and SW5. It is not desirable that parking brake system 18 be engaged if the operator is attempting to propel unit 2 by the forward or rearward rotation of control sticks 14.

Thus, if logic and control chip or circuit 54 detects that the control sticks 14, or either one of them, is not in neutral, it will not allow parking brake system 18 to engage, either by the operator rising off seat 10 or by the operator manually setting the Brake Engage position of brake switch SW6, and will instead kill the engine of unit 2. Alternatively, if parking brake system 18 is engaged when control sticks 14 are moved out of neutral, this will be detected and the engine will kill while parking brake system 18 remains engaged.

Actuator system 28' according to the second embodiment of this invention has many of the same desirable characteristics as that of the first embodiment. It automatically engages parking brakes 20 whenever the operator is out of seat 10, thus relieving the operator of the burden of having to manually engage and disengage parking brake system 18 as the operator dismounts and remounts unit 2. It also activates parking brake system 18 in a reliable manner using a powered solenoid 30 and without having any unduly complicated mechanical linkages. Moreover, actuator system 28' could be used on units that have other types of steering and propulsion controls instead of the twin control sticks 14 that are shown, namely on units having a steering wheel and propulsion pedal.

Each control circuit 50 and 50' as shown in FIGS. 6 and 7 performs other control functions that are not germane to this invention. Thus, the remaining portions of control circuits 50 and 50' have not been specifically described in this Detailed Description.

Various modifications of this invention will be apparent to those skilled in the art. Thus, the scope of the invention shall be limited only by the appended claims.

We claim:

1. An outdoor power equipment unit, which comprises:
   (a) a frame supported for movement over the ground by a plurality of wheels, at least one wheel being a drive wheel to propel the frame over the ground;
   (b) an implement carried on the frame for performing a ground or turf grooming or working operation;
   (c) a parking brake system; and
   (d) a powered actuator operatively coupled to the parking brake system for disengaging the parking brake system when the powered actuator is energized and a spring to engage the parking brake system when the powered actuator is deenergized.

2. The outdoor power equipment unit of claim 1, further including a seat on the frame for carrying an operator and a seat switch for detecting the presence of the operator in the seat, the powered actuator being energized when the seat switch signals that the operator is present in the seat.

3. The outdoor power equipment unit of claim 1, further including a seat on the frame for carrying an operator and twin control sticks for allowing the operator to steer and control propulsion of the unit, the twin control sticks each having an inboard position generally in front of the seat and a laterally pivoted, outboard position to one side of the seat, and further including at least one control stick switch for detecting when at least one control stick is disposed in its inboard position, the powered actuator being energized to cause the parking brake system to be disengaged when the at least one control stick switch signals that the at least one control stick is in the inboard position thereof.

4. The outdoor power equipment unit of claim 3, wherein two control stick switches are provided with one control stick switch associated with each control stick, and wherein the powered actuator ie further energized to cause the parking brake system to be disengaged when the two control stick switches signal that both control sticks are in their inboard positions.

5. The outdoor power equipment unit of claim 2, further including a brake switch having at least an override position for allowing the operator to deenergize the powered actuator to engage the parking brake system even when the operator remains in the seat.

6. The outdoor power equipment unit of claim 5, wherein the brake switch has two positions including an auto position and the override position, the energization of the powered actuator being controlled by the seat switch when the brake switch is in the auto position and the energization of the powered actuator being controlled by the brake switch when the brake switch is in the override position.

7. The outdoor power equipment unit of claim 2, wherein the powered actuator is deenergized to engage the parking brake system only after a predetermined time delay after the seat switch signals that the operator is not in the seat so that momentary bouncing of the operator up and down off the seat during operation of the unit does not inadvertently engage the parking brake system.

8. The outdoor power equipment unit of claim 1, further including at least one freewheel lever for allowing the at least one drive wheel to freewheel so the unit can be manually pushed or pulled, and further including a manually actuated release member that can be moved by the operator into a first position for releasing the freewheel lever to allow freewheeling, wherein the manually actuated release member in the first position thereof also manually disengages the parking brake system.

9. The outdoor power equipment unit of claim 8, wherein the powered actuator has an armature that is spring biased outwardly when the powered actuator is deenergized and the parking brake system is engaged, and wherein the release member is arranged adjacent the powered actuator such that the release member pushes inwardly on the armature of the powered actuator to manually actuate the powered actuator to thereby engage the parking brake system.

10. The outdoor power equipment unit of claim 8, wherein the manually actuated release member can be selectively locked in the first position in which the at least one freewheel lever has been released and the parking brake system has been disengaged.

11. The outdoor power equipment unit of claim 10, wherein the manually actuated release member is locked by sliding the release member to one side in a direction that is substantially perpendicular to the direction in which the operator moves the release member to release the at least one freewheel lever.

12. The outdoor power equipment unit of claim 11, wherein the manually actuated release member includes a latch finger that enters into a slot or aperture for locking the release member in place.

13. The outdoor power equipment unit of claim 12, wherein the slot or aperture is carried in a bracket on which the powered actuator is mounted.

14. The outdoor power equipment unit of claim 8, wherein there are two drive wheels each of which is driven by its own independent transaxle each transaxle having its own separate freewheel lever, and wherein the release member is operatively connected to both freewheel levers to simultaneously actuate both freewheel levers as the release member is moved into the first position thereof.

15. The outdoor power equipment unit of claim 1, wherein the implement is a cutting deck such that the outdoor power equipment unit is a riding lawn mower.

16. The outdoor power equipment unit of claim 1, wherein the powered actuator is an electrical solenoid.

17. An outdoor power equipment unit, which comprises:
  (a) a frame supported for movement over the ground by a plurality of wheels;
  (b) dual independent transaxles for driving two of the wheels on opposite sides of the frame to propel the frame over the ground in both forward and reverse directions;
  (c) an implement carried on the frame for performing a ground or turf grooming or working operation;
  (d) a seat on the frame for carrying an operator;
  (e) twin control sticks for allowing the operator to steer and propel the unit, the twin control sticks having inboard positions generally in front of the seat and outboard positions that are laterally pivoted out of the way of the seat;
  (f) dual parking brakes associated with the dual transaxles for preventing rotation of the drive wheels of the frame when the parking brakes are engaged;
  (g) a powered actuator for engaging the parking brakes when the actuator is in a first position and for disengaging the parking brakes when the actuator is in a second position; and
  (h) a control system for moving the actuator between its first and second positions to engage and disengage the parking brakes respectively, the control system comprising at least one control stick switch associated with at least one control stick, the control system moving the actuator into the second position thereof when the at least one control stick switch detects the presence of the at least one control stick in the inboard position thereof.

18. The outdoor power equipment unit of claim 17, wherein the control system further comprises a seat switch, the control system further moving the actuator into the second position when the seat switch also detects the presence of the operator in the seat.

19. An electrically powered actuator system for engaging and disengaging the parking brake system of an outdoor power equipment unit, wherein the parking brake system comprises dual parking brakes contained on dual, independent transaxles that propel the unit forwardly and rearwardly, which comprises:
  (a) a solenoid having a solenoid housing and an armature with the armature of the solenoid being extended from the solenoid housing when the solenoid housing is deenergized and with the armature of the solenoid being pulled into the housing when the solenoid is energized;
  (b) dual link arms coupling the armature of the solenoid to the dual parking brakes with each parking brake being pivotally mounted on the corresponding transaxle, wherein the link arms rotate the parking brakes into engaged positions when the solenoid is deenergized and the armature of the solenoid is extended from the housing, and wherein the link arms rotate the parking brakes into their disengaged positions when the solenoid is energized and the armature of the solenoid is drawn inwardly into the solenoid housing; and
  (c) an electrical control system for energizing and deenergizing the solenoid to engage and disengage the parking brakes.

20. The outdoor power equipment unit of claim 19, wherein the unit has twin stick propulsion and steering controls having inboard positions generally in front of an operator's seat, and wherein the control system is responsive to the placement of the unit's twin stick controls in the inboard positions such that the solenoid is energized and the parking brakes are disengaged when the twin stick controls are in their inboard positions.

21. The outdoor power equipment unit of claim 19, wherein the control system is responsive to the presence of the operator in a seat of the unit such that the solenoid is energized and the parking brakes are disengaged when the operator is sitting in the seat.

22. An outdoor power equipment unit, which comprises:
  (a) a frame supported for movement over the ground by a plurality of wheels, at least one wheel being a drive wheel to propel the frame over the ground;
  (b) an implement carried on the frame for performing a ground or turf grooming or working operation;
  (c) a parking brake system which is engaged and disengaged by at least one manually movable control lever that can be selectively moved by an operator;
  (d) at least one freewheel lever for allowing the at least one drive wheel to freewheel so the unit can be manually pushed or pulled; and (e) a manually actuated release member that is separate and distinct from the manually movable control lever and that can be moved by the operator into a first position for releasing the freewheel lever to allow freewheeling, wherein the manually actuated release member in the first position thereof also manually disengages the parking brake system independently of the operation of the movable control lever.

* * * * *

UNITED STATES PATENT AND TRADEMARK OFFICE
CERTIFICATE OF CORRECTION

PATENT NO. : 6,739,116 B2  Page 1 of 1
DATED : May 25, 2004
INVENTOR(S) : Dale A. Stover et al.

It is certified that error appears in the above-identified patent and that said Letters Patent is hereby corrected as shown below:

Column 10,
Line 48, change "ie" to -- is --.

Signed and Sealed this

Nineteenth Day of April, 2005

JON W. DUDAS
*Director of the United States Patent and Trademark Office*